United States Patent [19]

Durm

[11] Patent Number: 4,923,205
[45] Date of Patent: May 8, 1990

[54] TOWING DEVICE FOR VEHICLES

[75] Inventor: Jürgen Durm, Ditzingen, Fed. Rep. of Germany

[73] Assignee: Dr. Ing. h.c.F. Porsche AG, Fed. Rep. of Germany

[21] Appl. No.: 327,537

[22] Filed: Mar. 23, 1989

[30] Foreign Application Priority Data

Mar. 25, 1988 [DE] Fed. Rep. of Germany ....... 3810164

[51] Int. Cl.⁵ .......................... B60D 1/06; B60D 1/10
[52] U.S. Cl. ................................. 280/491.3; 280/507; 280/511
[58] Field of Search ..................... 280/511, 491.1, 401, 280/491.3, 495, 504, 403, 507

[56] References Cited

FOREIGN PATENT DOCUMENTS 3223719 12/1983 Fed. Rep. of Germany .
3238094  4/1984 Fed. Rep. of Germany ...... 280/511
3541714  5/1987 Fed. Rep. of Germany ...... 280/511
2175864 12/1986 United Kingdom ................ 280/511

Primary Examiner—Charles A. Marmor
Assistant Examiner—Alan M. Kagen
Attorney, Agent, or Firm—Evenson, Wands, Edwards, Lenahan & McKeown

[57] ABSTRACT

A towing device for vehicles comprises a transverse support, which is mounted at the rearward end and has a receiving part for the releasable holding of a ball neck with a coupling ball. An end part of the ball neck is inserted from below into the receiving part and is non-rotatably held by a locking mechanism. During the releasing of the ball neck, this ball neck can only cover a defined falling course, due to the provision of a catching device, having a transversely extending pin, which penetrates the ball neck and projects beyond it on both sides, and further has a catch hook located underneath the ball neck. The catch hook has a stationary upper part and a swivelling lower part, which is connected with the upper part, the lower part, which cooperates with a spring element, having hook portions for receiving the projecting portions of the transversely extending pin located above it.

11 Claims, 3 Drawing Sheets

TOWING DEVICE FOR VEHICLES

BACKGROUND AND SUMMARY OF THE INVENTION

The invention generally relates to a towing device for vehicles, particularly passenger cars, having a releasable ball neck and more particularly to a catching device for providing a defined fall course for the ball neck in the event of its release and for operatively disengaging the ball neck from the towing device if a weight greater than the weight of the ball neck is present upon its release while still retaining the ball neck.

In a known towing device of the initially mentioned type (DE-OS 32 38 094), the ball neck is released by means of remote control. This device has the disadvantage that the ball neck, which has a relatively high weight, after the release, falls downward unhindered and may damage the ground or the floor area, unless it is held in position by a second person.

In order to avoid this circumstance, it is known from DE-OS 35 41 714, to provide a catching device for the releasably fastened ball neck at a towing device for a passenger car, so that the ball neck can cover only a defined falling distance. This catching device consists of a barb, which is mounted at the receiving part and which cooperates with a hook element provided at the ball neck. This device has the disadvantage that expensive measures must be carried out for producing a catching device, particularly at the ball neck, resulting in a significant increase in manufacturing costs.

It is an object of the present invention to provide a catching device for a towing device which, while it functions well and has a simple construction, can be produced in a cost-effective way.

Another object of the present invention is to provide a towing device adapted to ensure that it is impossible to accidentally hitch a trailer to the released ball neck or to actually drive away with the towing device in this released position.

According to the invention, these and other objects are achieved by constructing the catching device so that the ball neck is retained unless a weight, in addition to the weight of the ball neck, is present upon its release in which case, the ball neck is operatively disconnected from the towing device but still retained by the catching device.

The main advantages achieved by means of the invention are that the catching device, which includes only an additional catch hook and the transversely extending pin, which is present at the ball neck anyhow, has a simple construction and requires low manufacturing costs. By means of the swivelling construction of the lower part of the catch hook, it is ensured that, when the ball neck is released, no trailer can be coupled to it, since otherwise the ball neck together with the trailer tilts away downward and the ball neck is operatively disconnected from the towing device but still retained by the catching device. The catch hook is an easily manufacturable and easily mountable component. By means of the hook portions at the lower part of the catch hook, the ball neck, which falls down during the release, is accommodated securely, before it comes in contact with the ground unless a weight, in addition to the weight of the ball neck, is present.

Other objects, advantages and novel features of the present invention will become apparent from the following detailed description of the invention when considered in conjunction with the accompanying drawings.

DETAILED DESCRIPTION OF THE DRAWINGS

Figure 1:
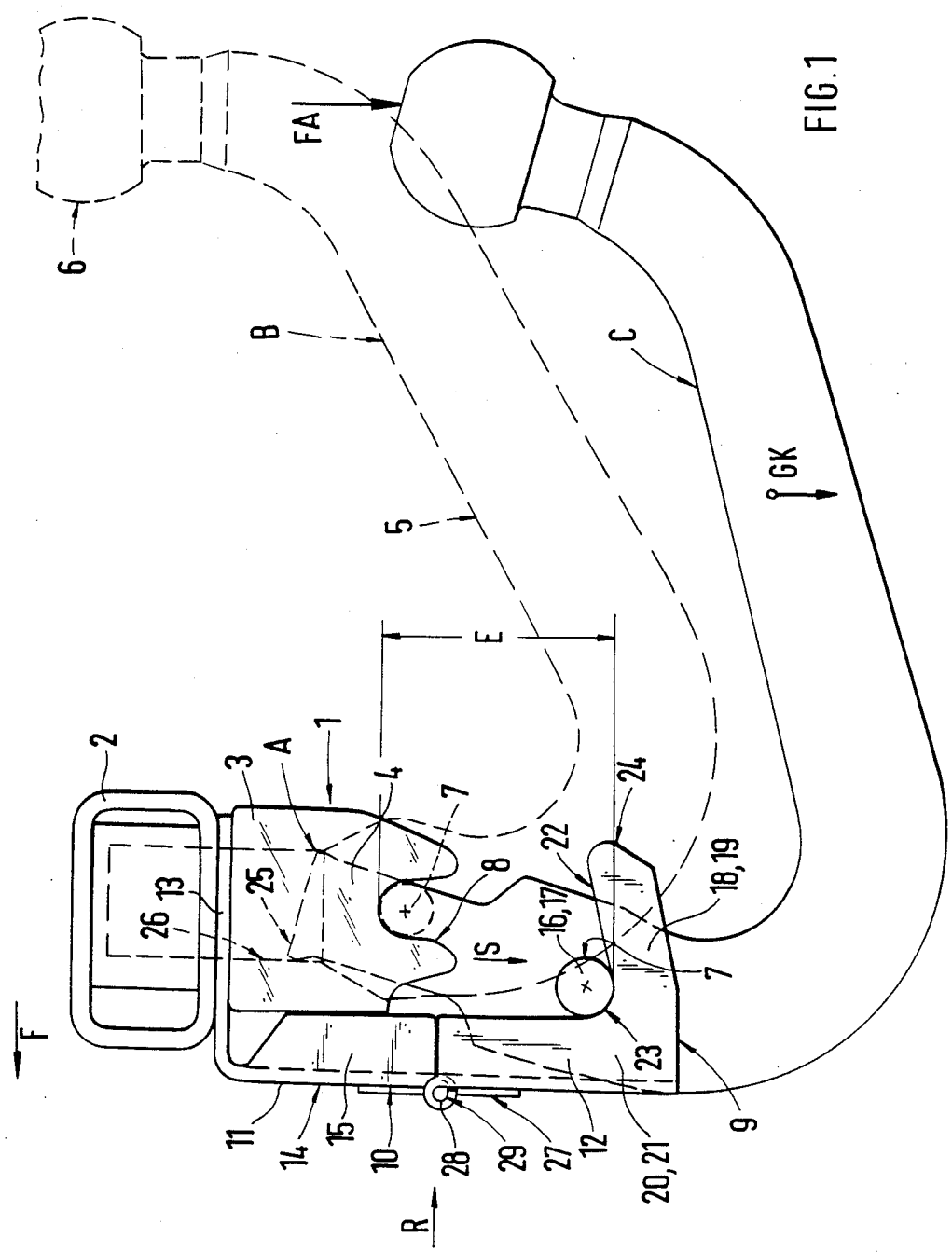
FIG. 1 is a lateral view of a towing device with the catching device according to the invention.

An embodiment of the invention is shown in the drawing and will be explained in detail in the following.

Figure 2:
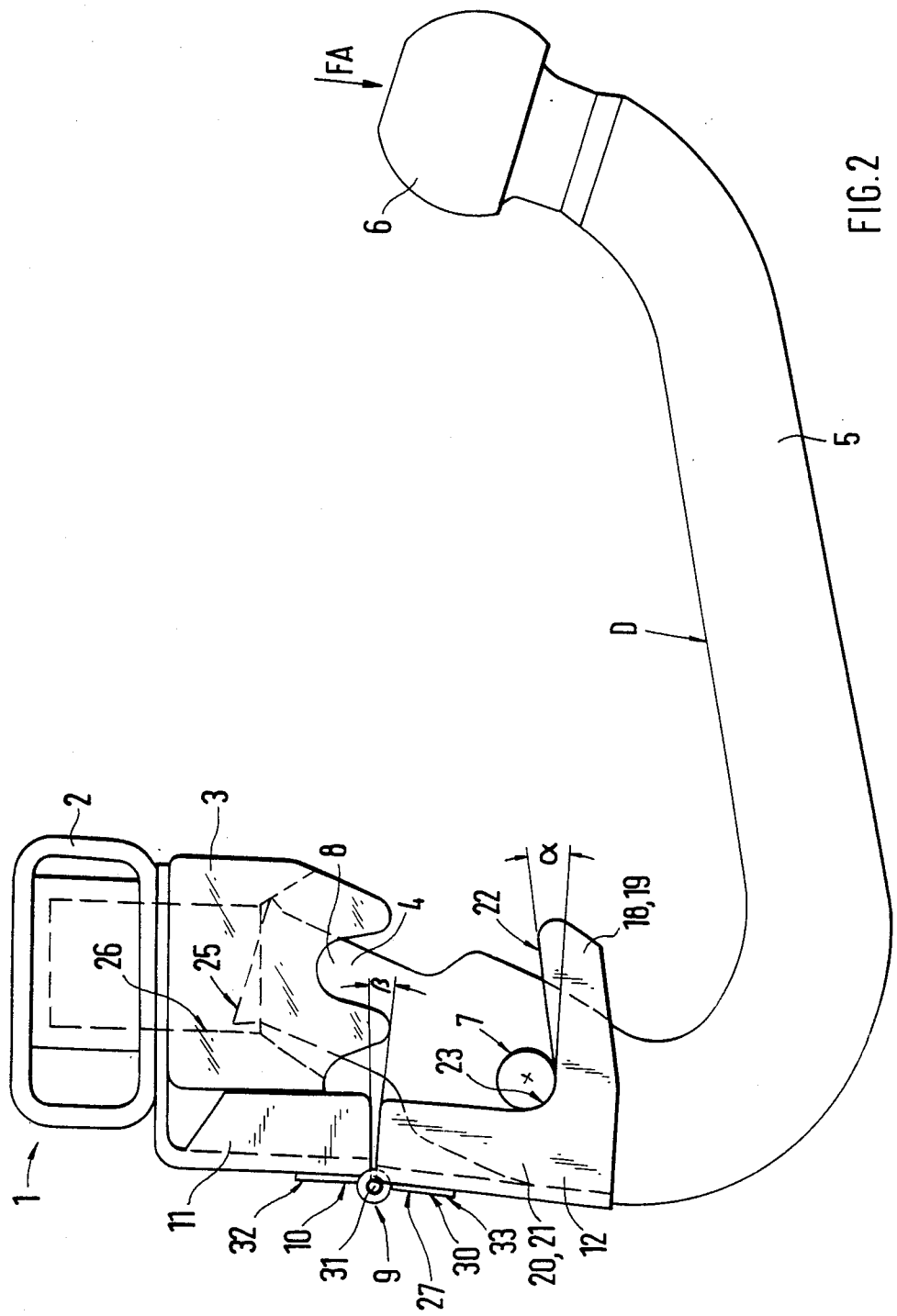
FIG. 2 is a view corresponding to FIG. 1, where the lower part of the catching device is in its swivelled-away position.

According to FIGS. 1 and 2, a towing device 1 is provided at the rearward end of a passenger car, which is not shown. This towing device 1 comprises a transverse support 2, which in its cross-section is constructed, for example, as a rectangular tube, and at which a receiving part 3 is fastened for the end part 4 of a ball neck 5 with the coupling ball 6.

In order to prevent the ball neck 5 from twisting, a transversely extending pin 7 is used, which is provided at the vertically aligned end part 4 and which extends through the ball neck 5 and projects beyond it on both sides. When the towing device 1 is locked, the pin 7 engages in a correspondingly constructed groove 8 at the receiving part 3. For the releasable fastening of the end part 4 of the ball neck 5 at the receiving part 3, a locking mechanism is provided, which is not shown in detail and which cooperates with a remote control. This type of an arrangement is described in detail, for example, in DE-OS 32 38 094.

So that the ball neck 5, which has a relatively high weight, after the unlocking, can cover only a defined falling distance E, a catching device 9 for the ball neck 5 is provided at the towing device 1 below the receiving part 3. The catching device 9 cooperates with the transversely extending pin 7, which penetrates the ball neck 5 by means of a catch hook 10, which is held in position at a stationary part of the towing device 1. The catch hook 10 has an angular upper part 11 and also an angularly constructed lower part 12, the lower part 12 being pivotable with respect to the upper part 11 in a defined manner (angle β). A horizontal web 13 of the upper part 11, located at the end face, is fastened at the lower side of the transverse support 2. According to FIG. 1, the web 13 is clamped in between the transverse support 2 and the receiving part 3 located below it and, in addition, is fastened by means of screws. The vertically extending portion 14 of the upper part 11 has a U-shaped profile, the free ends of the spaced legs 15 pointing away from the forward driving direction F. The legs 15, in transverse direction, are spaced away from one another a sufficient distance so that the ball neck 5 may be accommodated between them.

Figure 4:
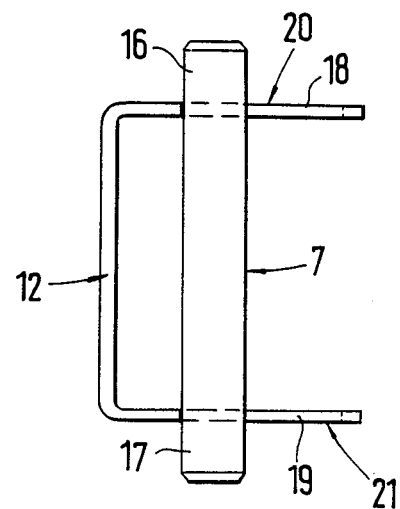
FIG. 4 is a view in the direction of the arrow S of FIG. 1.

The lower part 12 also has a U-shaped profile and has the same width as the upper part 11. The projecting portions 16, 17 of the pin 7, when the ball neck 5 is released, support themselves at the hook portions 18, 19 of the lower part 12, the pin 7 projecting beyond the hook portions on both sides (FIG. 1, 2 and 4). The hook portions 18, 19 extend away from the lower edge of the legs 20, 21 of the lower part 12, which extend in longitudinal direction of the vehicle, an upper limiting edge 22 of the hook portions 18, 19, which cooperates with the pin 7, sloping from a radii-shaped transition area 23 diagonally upward at an acute angle α.

The free ends 24 of the hook portions 18, 19 have a rounded shape. The position of the upper limiting edge 22 or of the radii-shaped transition area 23, viewed in vertical direction, is selected to be such that, when the ball neck is released and lowered, an upper edge 25 of the end part 4 supports itself at a cylindrical area 26 of the receiving part 3 (FIG. 1).

In this position of the ball neck 5, the upright portion of the lower part 12 is aligned to be in parallel with the upper part 11 located above it (FIG. 1).

The lower part 12 cooperates with a spring element 27 in that the lower part 12 can be swivelled clockwise (toward the rear) by an angle β only when a downward-directed defined axial force FA occurs at the coupling ball 6. This position D of the ball neck is shown in FIG. 2. However, the lower part 12 is not swivelled away by the weight of the ball neck GK alone.

Figure 3:
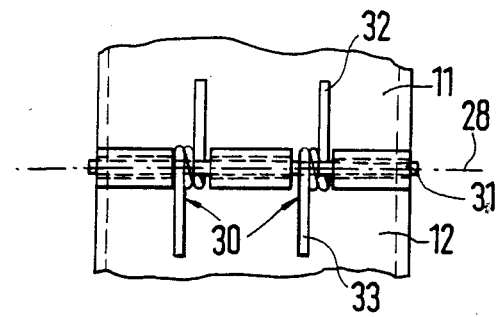
FIG. 3 is a view in the direction of the arrow R of FIG. 1.

The lower part 12 can be swivelled with respect to the upper part 11 around an approximately horizontally in longitudinal direction of the vehicle extending transverse shaft 28. According to FIG. 1, a hinge 29 is provided for the hinged connection of the upper part 11 and the lower part 12, this hinge 29 being provided on the side of the catch hook 10 which faces away from the ball neck 5. The spring element 27, corresponding to FIG. 3, is constructed as a leg spring 30 which surrounds a hinge pin 31 in portions, the free elongated ends 32, 33 of the leg spring 30, on one side, supporting themselves at the upper part 11 and, on the other side, at the lower part 12. The ends 32, 33 extend in vertical direction.

The hinged connection between the upper part 11 and the lower part 12 and the spring element 27 may naturally also have a different constructive design. The only important characteristic is that the lower part can be swivelled or deflected with respect to the upper part.

The rotating shaft 28 extends in a lower area of the receiving part 3. In order to prevent that, when the ball neck 5 is lowered, this fact is not noticed and a trailer is hitched to the coupling ball 6, the lower part 12 of the catch device will swivel away clockwise at an angle β, when a downward-directed axial force FA is exercised on the coupling ball 6, and the ball neck 5 will slide away downward from the abutment point A and fall out of the receiving part 3. After the locking mechanism is released, the ball neck 5 falls from an operating position B, shown by an interrupted line, by a defined path E, downward into a lowered position C which is established by the catching device 9.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A towing device for vehicles, particularly passenger cars, comprising a transverse support mounted at the rearward end of the vehicle, which has a receiving part for the releasable holding of a ball neck with a coupling ball, an end part of the ball neck being inserted into the receiving part from below and being non-rotatably held by a locking mechanism, and a pin being arranged at the ball neck, which extends in transverse direction of the vehicle and projects beyond the ball neck on both sides, wherein a catching device is provided at a predetermined distance below the locking mechanism for catching the ball neck after falling the predetermined distance when the ball neck is released from the receiving part which includes the pin, which penetrates the ball neck, and catch hook, which is held in position at a stationary part of the towing device, the catch hook having a stationary upper part and a swivelling lower part, which is connected with the upper part, the lower part, which cooperate with a spring element, having hook portions for receiving the projecting portions of the pin located above it.

2. A towing device according to claim 1, wherein that the lower part can be moved with respect to the upper part around a rotating shaft which extends approximately horizontally and in transverse direction of the vehicle.

3. A towing device according to claim 1, wherein the spring element has a stiffness such that, when the ball neck falls downward, the lower part remains approximately in its position, which is aligned in parallel with respect to the upper part, whereas, when a downward vertical force is exercised on the coupling ball, the lower part is automatically swivelled so that the ball neck is disengaged completely from the receiving part and tilts away downward.

4. A towing device according to claim 1, wherein the hook portions extend away from a lower edge of the lower part, an upper limiting edge of the hook portions, which cooperates with the pin, sloping substantially linearly upward at an acute angle.

5. A towing device according to claim 1, wherein the upper part of the catch hook is fastened at the transverse support of the towing device.

6. A towing device according to claim 1, wherein the spring element is formed by a leg spring.

7. A towing device according to claim 1, wherein the upper part and the lower part of the catch hook are connected with one another by a hinge.

8. A towing device according to claim 7, wherein the rotating shaft of the hinge extends approximately in the area of a lower edge of the receiving part.

9. A towing device according to claim 1, wherein the upper part and the lower part are formed at least in portions.

10. A towing device according to claim 1, wherein when the ball neck is locked, the pin extends at a predetermined vertical distance with respect to the hook portions of the catch hook located underneath.

11. A towing device according to claim 1, wherein the catching device provides a defined fall course for the ball neck in the event of its release and operatively disengages the ball neck from the towing device if a weight greater than the weight of the ball neck is present upon its release while still retaining the ball neck.

* * * * *